US012091002B2

(12) United States Patent
Lee et al.

(10) Patent No.: US 12,091,002 B2
(45) Date of Patent: Sep. 17, 2024

(54) DRIVER ASSIST DEVICE AND METHOD FOR OPERATING THE SAME

(71) Applicants: Hyundai Motor Company, Seoul (KR); Kia Motors Corporation, Seoul (KR)

(72) Inventors: Kyoung Jun Lee, Seoul (KR); Dong Eon Oh, Seoul (KR); Beom Jun Kim, Seoul (KR); Doo Jin Um, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 537 days.

(21) Appl. No.: 16/929,795

(22) Filed: Jul. 15, 2020

(65) Prior Publication Data

US 2021/0284145 A1    Sep. 16, 2021

(30) Foreign Application Priority Data

Mar. 11, 2020  (KR) .......................... 10-2020-0030372

(51) Int. Cl.
*B60W 30/09*     (2012.01)
*B60W 30/095*    (2012.01)
*B60W 30/18*     (2012.01)

(52) U.S. Cl.
CPC ........ *B60W 30/0953* (2013.01); *B60W 30/09* (2013.01); *B60W 30/18163* (2013.01)

(58) Field of Classification Search
CPC ............ B60W 30/0953; B60W 30/09; B60W 30/18163; B60W 2520/10;
(Continued)

(56) References Cited

U.S. PATENT DOCUMENTS 9,180,881 B2 * 11/2015 Lim .................... B60W 40/105
10,946,859 B2 *  3/2021 Kim .................... B60W 30/165
(Continued)

FOREIGN PATENT DOCUMENTS

JP     H11254996    * 11/2001
JP    2014061792 A  *  4/2014
(Continued)

OTHER PUBLICATIONS

Genesis GV 80 Catalog, URL: <https://www.genesis.com/kr/en/download-center.html>.
(Continued)

*Primary Examiner* — Daniel M. Robert
(74) *Attorney, Agent, or Firm* — Fox Rothschild LLP

(57) ABSTRACT

A driver assist device and a method for operating the device are provided. The driver assist device includes a processor and a non-transitory storage medium containing program instructions executed by the processor. When a vehicle changes a lane from a traveling lane to a target lane, the processor determines a possibility of collision between the vehicle and another vehicle in the target lane and calculates an expected amount of deceleration of the vehicle with respect to a target vehicle in the target lane when there is no possibility of collision between the vehicle and the another vehicle. The processor compares the calculated expected amount of deceleration of the vehicle with a deceleration criterion, and determines whether to perform lane change assist control based on the comparison result.

19 Claims, 6 Drawing Sheets

(58) Field of Classification Search
CPC ... B60W 2554/4042; B60W 2554/802; B60W 2720/106; B60W 30/0956; B60W 30/08; B60W 40/105; B60W 40/107; B60W 50/08; B60W 2520/105; B60Y 2300/08; B60Y 2300/18166

See application file for complete search history.

(56) References Cited

U.S. PATENT DOCUMENTS

| | | | |
|---|---|---|---|
| 2018/0046191 A1* | 2/2018 | Keller | B60W 30/10 |
| 2019/0084619 A1* | 3/2019 | Mizoguchi | G05D 1/0278 |
| 2019/0143968 A1* | 5/2019 | Song | G06V 20/588 |
| | | | 701/301 |
| 2019/0185005 A1* | 6/2019 | Fukuda | G08G 1/167 |
| 2019/0193739 A1* | 6/2019 | Tokimasa | B60W 40/04 |
| 2019/0217861 A1* | 7/2019 | Kurahashi | B60W 30/095 |

FOREIGN PATENT DOCUMENTS

| | | | | |
|---|---|---|---|---|
| KR | 101925141 | * | 4/2016 | ............ B60W 40/04 |
| WO | WO-2020135741 A1 | * | 7/2020 | ............ B60W 30/09 |

OTHER PUBLICATIONS

Genesis GV 80 Instruction manual, URL: <https://www.genesis.com/kr/en/download-center.html>.

Genesis luxury flagship SUV GV80 Debut in Seoul_Newsletter, URL: <https://www.genesis.com/kr/en/download-center.html>.

* cited by examiner

DRIVER ASSIST DEVICE AND METHOD FOR OPERATING THE SAME

CROSS-REFERENCE TO RELATED APPLICATION

This application claims the benefit of priority to Korean Patent Application No. 10-2020-0030372, filed on Mar. 11, 2020, the entire contents of which are incorporated herein by reference.

TECHNICAL FIELD

The present disclosure relates to a driver assist device and a method for operating the same, and more particularly, to a driver assist device and method that control an operating time point of a lane change assist function based on an expected amount of deceleration of a vehicle when changing a lane.

BACKGROUND

A lane change assist system determines whether there is a possibility of collision with vehicles in front of and behind a vehicle in a target lane to be changed and warns a driver about the possibility of collision. Further, when the possibility of collision is low, the lane change assist system actively assists lane change through steering control or similar control. The lane change assist system determines the possibility of collision with the vehicles in front of and behind the vehicle in the target lane using a time (e.g., a time to collision, TTC) it takes for the vehicle to collide with the vehicles in front of or behind the vehicle, a distance at which deceleration is possible at a current time point, and the like.

In other words, the existing lane change assist system prohibits the lane change or does not operate a lane change assist function by determining whether there is collision risk. However, even when the collision does not occur when the lane change assist function is operated, sudden deceleration may occur as the lane change is performed while decelerating the vehicle, which may cause a driver to feel discomfort.

SUMMARY

The present disclosure provides a driver assist device that controls an operating time point of a lane change assist function based on an expected amount of deceleration of a vehicle when changing a lane and a method for operating the same. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a driver assist device may include a processor, and a non-transitory storage medium containing program instructions executed by the processor, wherein the processor may be configured to determine, when a vehicle changes a lane from a traveling lane to a target lane, a possibility of collision between the vehicle and another vehicle traveling in the target lane, calculate an expected amount of deceleration of the vehicle with respect to a target vehicle in the target lane when there is no possibility of collision between the vehicle and the other vehicle, and compare the calculated expected amount of deceleration of the vehicle with a deceleration criterion, and determine whether to perform lane change assist control based on the comparison result.

The processor may be configured to activate a lane change assist function based on a user input. The user input may be a signal generated based on manipulation of a switch for activating the lane change assist function. The processor may be configured to calculate a first required acceleration of the vehicle with respect to a first target vehicle in the target lane, calculate a second required acceleration of the vehicle with respect to a second target vehicle in the traveling lane, and calculate the expected amount of deceleration based on a smaller required acceleration among the first required acceleration and the second required acceleration.

The processor may be configured to calculate a required acceleration with respect to a distance error between an actual distance between the vehicle and the first target vehicle and a preset target vehicle-to-vehicle distance, calculate a required acceleration with respect to a speed error between the vehicle and the first target vehicle, and calculate the first required acceleration from the required acceleration with respect to the distance error and the required acceleration with respect to the speed error. The processor may then be configured to limit the first required acceleration based on a time to collision of the vehicle with respect to the first target vehicle.

The processor may be configured to calculate the deceleration criterion based on a vehicle speed of the vehicle. The deceleration criterion may be set to be decreased as the vehicle speed of the vehicle increases. The processor may be configured to determine to perform the lane change assist control when the expected amount of deceleration is equal to or less than the deceleration criterion. The processor may be configured to determine not to perform the lane change assist control when the expected amount of deceleration is greater than the deceleration criterion.

According to another aspect of the present disclosure, a method for operating a driver assist device may include determining, when a vehicle changes a lane from a traveling lane to a target lane, a possibility of collision between the vehicle and another vehicle traveling in the target lane, calculating an expected amount of deceleration of the vehicle with respect to a target vehicle in the target lane when there is no possibility of collision between the vehicle and the other vehicle, and comparing the calculated expected amount of deceleration of the vehicle with a deceleration criterion to determine whether to perform lane change assist control.

The determining of the possibility of collision may further include activating a lane change assist function based on a user input. The user input may be a signal generated based on manipulation of a switch for activating the lane change assist function. The calculating of the expected amount of deceleration may include calculating a first required acceleration of the vehicle with respect to a first target vehicle in the target lane, calculating a second required acceleration of the vehicle with respect to a second target vehicle in the traveling lane, and calculating the expected amount of deceleration based on a smaller required acceleration among the first required acceleration and the second required acceleration.

The calculating of the first required acceleration may include calculating a required acceleration with respect to a distance error between an actual distance between the vehicle and the first target vehicle and a preset target vehicle-to-vehicle distance, calculating a required acceleration with respect to a speed error between the vehicle and the first target vehicle, and calculating the first required acceleration from the required acceleration with respect to the distance error and the required acceleration with respect to the speed error. The calculating of the first required acceleration may further include limiting the first required acceleration based on a time to collision of the vehicle with respect to the first target vehicle.

The calculating of the expected amount of deceleration may further include calculating the deceleration criterion based on a vehicle speed of the vehicle. The deceleration criterion may be set to be decreased as the vehicle speed of the vehicle increases. The determining of whether to perform the lane change assist control may include determining to perform the lane change assist control when the expected amount of deceleration is equal to or less than the deceleration criterion. The determining of whether to perform the lane change assist control may further include determining not to perform the lane change assist control when the expected amount of deceleration is greater than the deceleration criterion.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
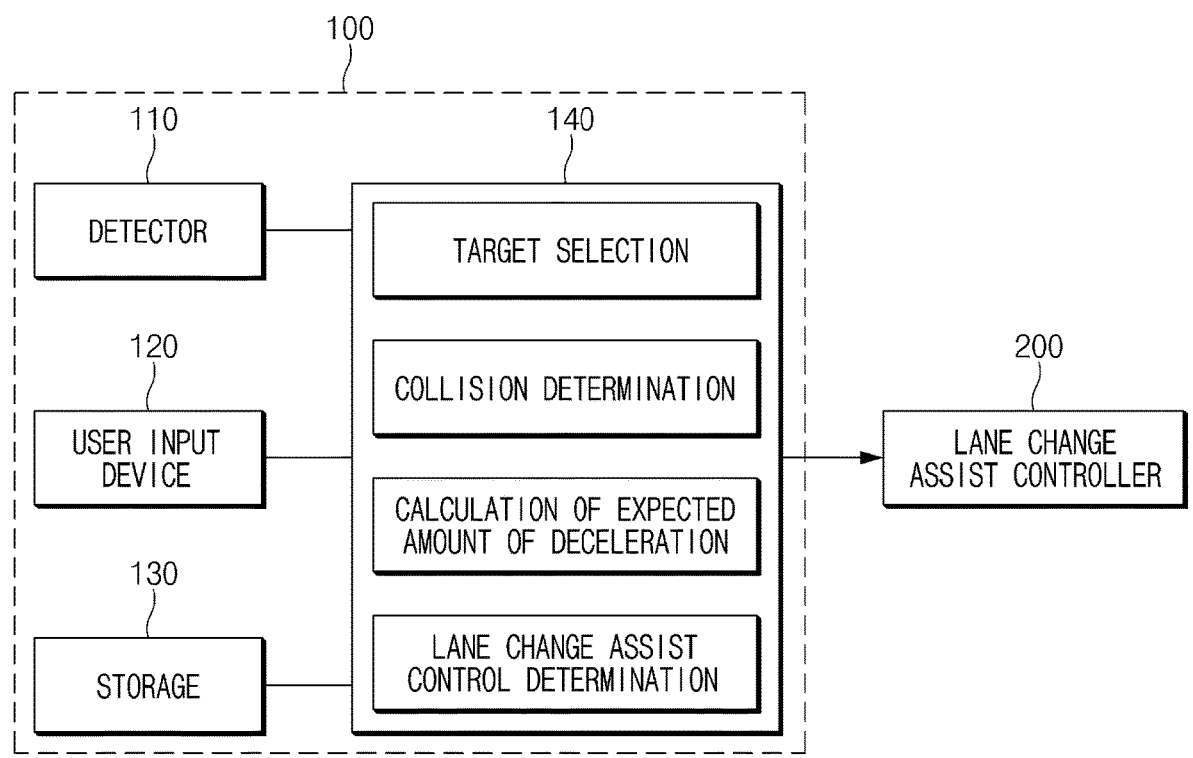
FIG. 1 is a block diagram of a driver assist device according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of the related known configuration or function will be omitted when it is determined that it interferes with the understanding of the embodiment of the present disclosure.

In describing the components of the exemplary embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
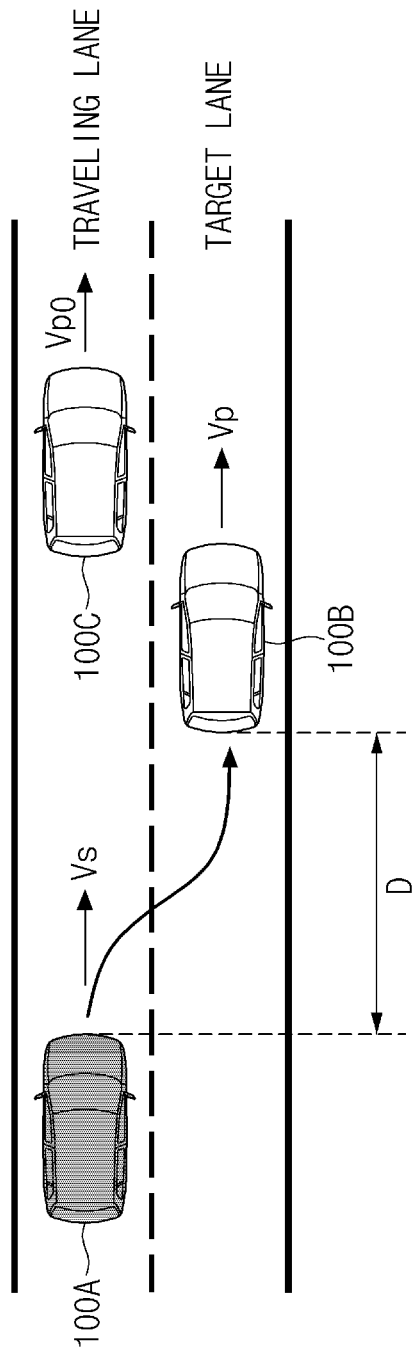
FIG. 2 is a view for describing calculation of an expected amount of deceleration according to an exemplary embodiment of the present disclosure.
Figure 3:
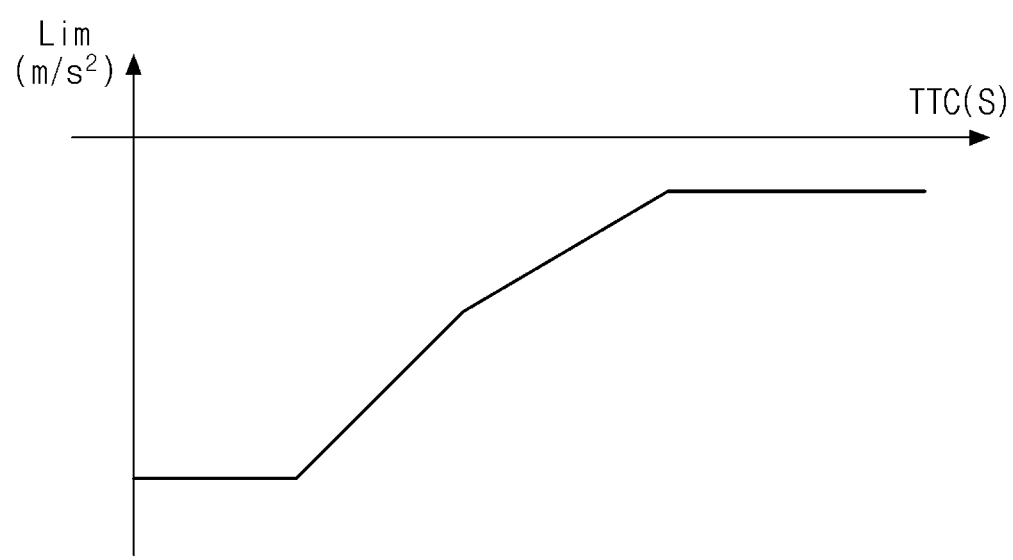
FIG. 3 is a graph showing a deceleration limit based on a time to collision according to an exemplary embodiment of the present disclosure.
Figure 4:
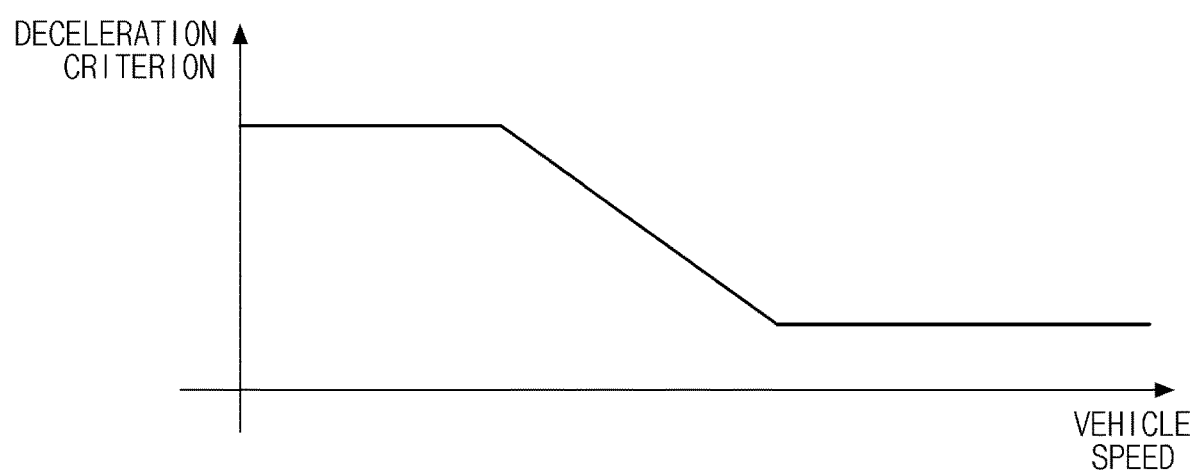
FIG. 4 is a graph showing a deceleration criterion based on a vehicle speed according to an exemplary embodiment of the present disclosure.

FIG. 1 is a block diagram of a driver assist device according to an exemplary embodiment of the present disclosure. Further, FIG. 2 is a view for describing calculation of an expected amount of deceleration associated with the present disclosure. FIG. 3 is a graph showing a deceleration limit based on a time to collision associated with the present disclosure. Further, FIG. 4 is a graph showing a deceleration criterion based on a vehicle speed associated with the present disclosure.

Referring to FIG. 1, a driver assist device 100 may include a detector 110, a user input device 120, a storage 130, and a processor 140. The processor 140 may be configured to operate the other components of the device 100. In particular, the detector 110 may be configured to recognize or detect a location and a speed of an object located around a vehicle, that is, a moving object or a stationary object using various sensors mounted on the vehicle. In addition, the detector 110 may also be configured to detect a location, a curvature, and the like of a line on the road on which the vehicle is being driven using the sensors. In this connection, the sensors may include a light detection and ranging (LiDAR), a radio detecting and ranging (radar), a camera (an image sensor), an ultrasonic sensor, a speed sensor, and the like.

The user input device 120 may be configured to generate data based on manipulation of a user. For example, the user input device 120 may be configured to generate a signal of turning on or off a turn indicator based on a user input. In addition, the user input device 120 may be configured to generate a signal of activating (ON) or deactivating (OFF) a lane change assist function based on a user input. The user input device 120 may be disposed on a steering wheel, a dashboard, a center fascia, and/or a door trim, and may be formed as a keyboard, a keypad, a button, a switch, a touch pad, and/or a touch screen.

The storage 130 may be a non-transitory storage medium containing program instructions executed by the processor 140 and may be configured to temporarily store data input to and/or output from the processor 140. The storage 130 may be implemented as at least one of storage media (recording media) such as a flash memory, a hard disk, a secure digital card (SD card), a random access memory (RAM), a static random access memory (SRAM), a read only memory (ROM), a programmable read only memory (PROM), an electrically erasable and programmable ROM (EEPROM), an erasable and programmable ROM (EPROM), a register, a removable disk, a web storage, and the like.

The processor 140 may be configured to execute overall operations of the driver assist device 100. The processor 140 may be implemented as at least one of an application specific integrated circuit (ASIC), a digital signal processor (DSP), a programmable logic device (PLD), a field programmable gate array, a central processing unit (CPU), a microcontroller, and a microprocessor.

The processor 140 may be configured to perform functions such as target selection, collision determination, calculation of an expected amount of deceleration, lane change assist control determination, and the like. In addition, the processor 140 may be configured to exchange data with a lane change assist controller 200 via a vehicle network (e.g., an in-vehicle network, IVN). In this connection, the vehicle network may be implemented as a controller area network (CAN), a media oriented systems transport (MOST) network, a local interconnect network (LIN), an ethernet, and/or an X-by-Wire (Flexray), and the like. The lane change assist controller 200 may include a communication module, a user input module, an output module, a processor, and a memory, although not shown in the drawings.

The processor 140 may be configured to operate the lane change assist function in response to receiving a lane change request. The processor 140 may be configured to receive a user input for performing the lane change assist function from the user input device 120. For example, when the user, that is, a driver manipulates a direction indicator (e.g., a turn indicator on-off switch) to turn on the turn indicator, the processor 140 may be configured to activate or operate the lane change assist function in the lane change assist controller 200. When the user manipulates a lane change assist function operation switch to operate the lane change function, the processor 140 may be configured to request the lane change assist controller 200 to activate the lane change assist function. In the present exemplary embodiment, the lane change request is described as being received from the user input device 120, but the present disclosure is not limited thereto and may be implemented such that the lane change request is received from another electronic control device (not shown) mounted on the vehicle or from an external terminal.

The processor 140 may be configured to detect locations, speeds, and the like of the objects located around the vehicle, for example, surrounding vehicles. In this connection, the processor 140 may be configured to detect objects (e.g., a vehicle in front of the vehicle and/or a vehicle in rear of the vehicle, and the like) for each lane of the road. For example, the processor 140 may be configured to detect a vehicle in front of the vehicle (e.g., a preceding vehicle) and a vehicle in rear of the vehicle (e.g., a following vehicle) traveling in a target lane into which the subject vehicle intends to enter through the lane change through the detector 110. In addition, the processor 140 may be configured to detect a vehicle in front of the vehicle (e.g., subject vehicle) and/or a vehicle in rear of the vehicle (e.g., subject vehicle) in a traveling lane in which the vehicle is traveling using the detector 110.

The processor 140 may be configured to classify the objects (e.g., the preceding vehicles) for each lane using the detector 110 to select target vehicle(s) when the lane change assist function is operated. The processor 140 may be configured to select the preceding vehicle in the target lane to be entered by the vehicle through the lane change as a first target vehicle. In addition, the processor 140 may be configured to select the preceding vehicle in the traveling lane in which the vehicle is located as a second target vehicle.

The processor 140 may be configured to determine whether there is a possibility of collision between the subject vehicle and the forward vehicle in front of the vehicle and/or the rear vehicle in rear of the vehicle traveling in the target lane when the lane of the subject vehicle is changed to the target lane. The processor 140 may be configured to calculate a time it takes for the subject vehicle to collide with the forward vehicle in front of the vehicle and/or the rear vehicle in rear of the vehicle, that is, a time to collision (TTC), and determine that there is the possibility of collision when the calculated TTC is less a reference TTC stored in advance in the storage 130. On the other hand, the processor 140 may be configured to determine that there is no possibility of collision when the calculated TTC is equal to or greater than the reference TTC.

When there is no possibility of collision between the subject vehicle and the forward vehicle in front of the vehicle and/or the rear vehicle in rear of the vehicle in the target lane, the processor 140 may be configured to calculate an expected deceleration of the vehicle with respect to the first target vehicle. The processor 140 may be configured to calculate an expected deceleration of the vehicle with respect to the second target vehicle in the traveling lane at the same time when calculating the expected deceleration of the vehicle with respect to the first target vehicle.

The processor 140 may be configured to simultaneously calculate a required acceleration (e.g., a first required acceleration) with respect to the preceding vehicle, that is, the first target vehicle in the target lane and a required acceleration (e.g., a second required acceleration) with respect to the preceding vehicle, that is, the second target vehicle in the traveling lane, and calculate a smaller required acceleration among the calculated first and second required accelerations as a final required acceleration (=MIN(the first required acceleration, the second required acceleration)). The processor 140 may then be configured to calculate the expected amount of deceleration based on the final required acceleration.

Hereinafter, a method for calculating the expected amount of deceleration of the vehicle with respect to the target vehicle when the preceding vehicle in the target lane is selected as the target vehicle (e.g., the first target vehicle) will be described in more detail with reference to FIGS. 2 and 3. The method will be understood to be executed by the processor specifically programmed to execute the steps described herein.

Particularly, the processor 140 may be configured to calculate a required acceleration of a vehicle 100A based on a distance difference (e.g., a distance error) between a target vehicle-to-vehicle distance $D_{target}$ and an actual distance (e.g., a measured distance) D between the vehicle 100A (e.g., the subject vehicle) and a first target vehicle 100B, that is, a required acceleration ReqAccelDis with respect to the distance error. The required acceleration ReqAccelDis with respect to the distance error may be represented as a following Equation 1.

$$\text{ReqAccelDis} = K_D s (D_{target} - D) \qquad \text{Equation 1}$$

In this connection, the target vehicle-to-vehicle distance $D_{target}$ is a vehicle-to-vehicle distance that is finally maintained when a traveling speed is constant and is set by the user (that is, the driver). $K_D$, which is an acceleration/deceleration control gain with respect to the distance error, is set in advance by a system designer.

Next, the processor 140 may be configured to calculate a required acceleration of the vehicle 100A based on a speed difference, that is, a speed error between a speed $V_S$ of the vehicle 100A and a speed $V_P$ of the first target vehicle 100B, which is a required acceleration ReqAccelSpd with respect to the speed error. The processor 140 may be configured to calculate the required acceleration ReqAccelSpd with respect to the speed error using Equation 2.

$$\text{ReqAccelSpd} = K_S s (V_P - V_S) \qquad \text{Equation 2}$$

In this connection, $K_S$, which is an acceleration/deceleration control gain with respect to the speed error, is set in advance by the system designer, like the KD.

The processor 140 may be configured to calculate a required acceleration ReqAccel with respect to the first target vehicle 100B in the target lane by adding the required acceleration ReqAccelDis with respect to the distance error and the required acceleration ReqAccelSpd with respect to the speed error. Additionally, the processor 140 may be configured to calculate an expected amount of deceleration of the vehicle with respect to the first target vehicle 100B based on the required acceleration ReqAccel with respect to the first target vehicle 100B. As shown in FIG. 3, the processor 140 may be configured to limit the required acceleration ReqAccel of the vehicle 100A with respect to the first target vehicle 100B based on a TTC of the vehicle 100A with respect to the first target vehicle 100B. Deceleration of the vehicle 100A with respect to the first target vehicle 100B, that is, the required acceleration ReqAccel with respect to the first target vehicle 100B may be defined as Equation 3.

$$\text{ReqAccel} = \text{Lim}(\text{ReqAccelDis} + \text{ReqAccelSpd}) \qquad \text{Equation 3}$$

In the present exemplary embodiment, although only calculating the required acceleration with respect to the preceding vehicle in the target lane is described, a required acceleration with respect to the preceding vehicle in the traveling lane may be calculated using a method same as a method for calculating the required acceleration with respect to the preceding vehicle in the target lane.

For example, the processor 140 may be configured to calculate a required acceleration with respect to a distance error based on a difference between an actual distance between the vehicle 100A and the preceding vehicle in the traveling lane, that is, a second target vehicle 100C and a target vehicle-to-vehicle distance $D_{target}$, and calculate a required acceleration with respect to a speed error based on a speed difference (=$V_{P0}-V_S$) between the vehicle 100A and the second target vehicle 100C. Additionally, the processor 140 may be configured to calculate a sum of the calculated two required accelerations as the required acceleration with respect to the preceding vehicle in the traveling lane. In this connection, the processor 140 may be configured to limit the required acceleration with respect to the preceding vehicle in the traveling lane based on a TTC of the vehicle 100A with respect to the second target vehicle 100C.

In addition, the processor 140 may be configured to calculate a deceleration criterion used to determine an operating time point of the lane change assist function. In this connection, the deceleration criterion, which is for riding comfort when the lane is changed, is a deceleration at which the driver does not feel discomfort. As shown in FIG. 4, the deceleration criterion may be set (calculated) to be decreased as a vehicle speed increases. The deceleration criterion based on the vehicle speed may be stored in advance in the storage 130 in a form of a lookup table.

The processor 140 may be configured to compare the expected amount of deceleration with the deceleration criterion, and determine whether to perform lane change assist control (e.g., whether to operate the lane change assist function) based on the comparison result. The processor 140 may be configured to determine to perform the lane change assist control in response to determining that the expected amount of deceleration is equal to or less than the deceleration criterion. On the other hand, in response to determining that the expected amount of deceleration is greater than the deceleration criterion, the processor 140 may be configured to determine not to perform the lane change assist control.

In one example, when there is the possibility of collision between the subject vehicle and the vehicle in front of the vehicle and/or the vehicle in rear of the vehicle in the target lane, the processor 140 may be configured to determine not to perform the lane change assist. As described above, the processor 140 may be configured to determine whether to perform (e.g., execute) the lane change assist function, that is, the operating time point of the lane change assist function based on the possibility of collision of the vehicle when changing the lane and the expected amount of deceleration.

Figure 5:
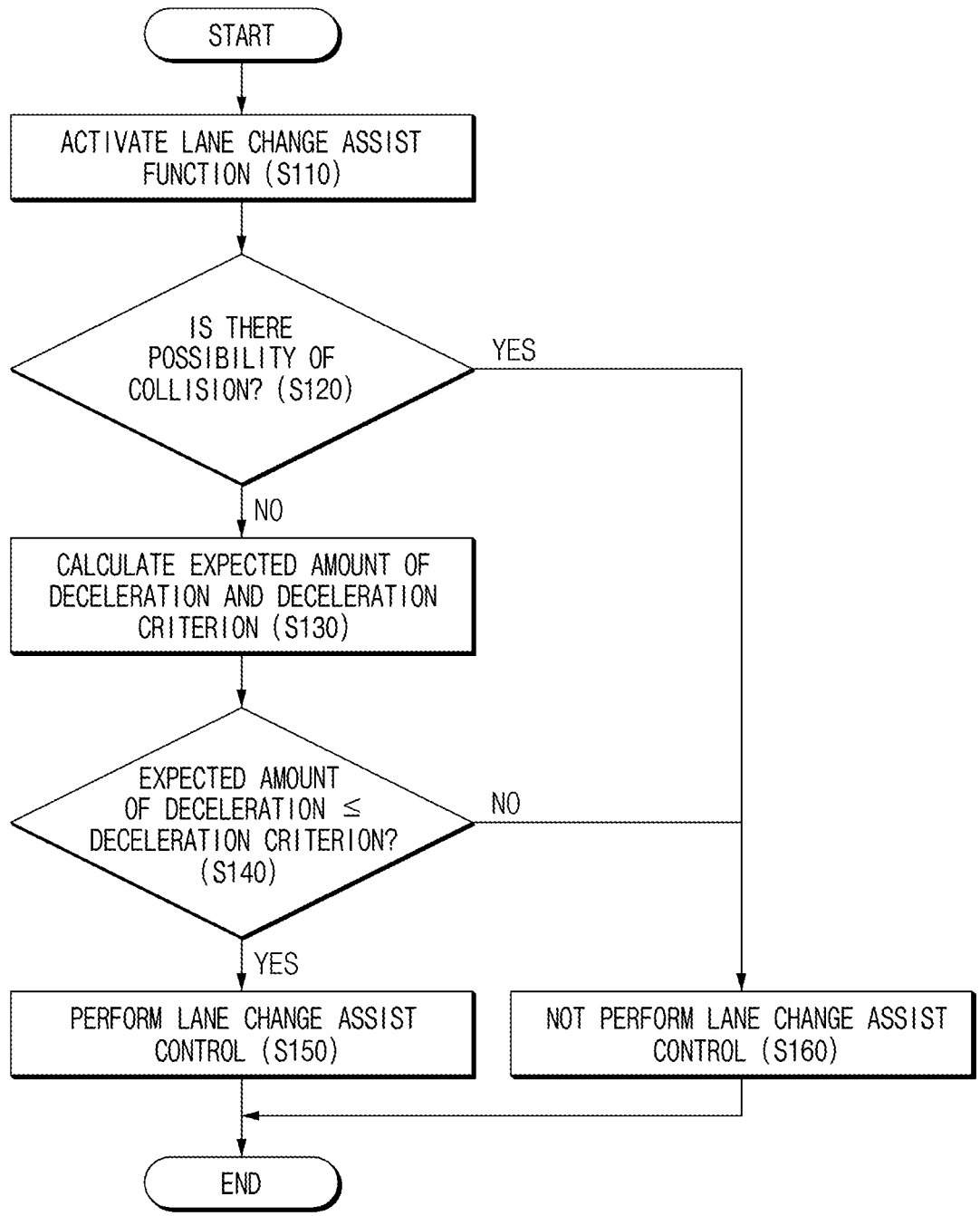
FIG. 5 is a flowchart showing a method for operating a driver assist device according to an exemplary embodiment of the present disclosure.

FIG. 5 is a flowchart showing a method for operating a driver assist device according to an exemplary embodiment of the present disclosure. Referring to FIG. 5, the processor 140 may be configured to activate the lane change assist function in response to receiving a the lane change request (S110). When the separate switch that turns on the turn indicator or activates the lane change assist function is manipulated by the driver, the processor 140 may be configured to communicate with the lane change assist controller 200 to activate the lane change assist function when the user input based on the manipulation of the driver is received. The processor 140 may be configured to select the preceding vehicle in the target lane to be entered through the lane change as the first target vehicle. In addition, the processor 140 may be configured to select the preceding vehicle of the vehicle in the traveling lane as the second target vehicle.

The processor 140 may be configured to determine whether there is a possibility of collision between the subject vehicle and another vehicle in the target lane (S120). The processor 140 may be configured to calculate a TTC of the vehicle with respect to another vehicle, for example, the vehicle in front of the vehicle and/or the vehicle in rear of the vehicle in the target lane. The processor 140 may be configured to determine the possibility of collision based on the calculated TTC. In other words, the processor 140 may be configured to determine that there is the possibility of collision in response to determining that the calculated TTC is less than the reference TTC stored in advance, and determine that there is no possibility of collision in response to determining that the calculated TTC is equal to or greater than the reference TTC.

The processor 140 may be configured to calculate the expected amount of deceleration and the deceleration criterion in response to determining that there is no possibility of collision (S130). In particular, the processor 140 may be configured to calculate the deceleration criterion based on the vehicle speed. In addition, the processor 140 may be configured to calculate the expected amount of deceleration of the vehicle when the preceding vehicle in the target lane is selected as the target vehicle. In other words, the processor 140 may be configured to calculate the deceleration (e.g., the first required acceleration) with respect to the first target vehicle in the target lane and the deceleration (e.g., the second required acceleration) with respect to the second target vehicle in the traveling lane, and calculate the expected amount of deceleration based on the smaller required deceleration among the calculated first and second required accelerations.

When calculating each required acceleration, the processor 140 may be configured to calculate the required acceleration based on the distance difference between the target vehicle-to-vehicle distance and the actual distance between the vehicle and the target vehicle, and the speed difference between the vehicle and the target vehicle. In addition, the processor 140 may be configured to limit the required acceleration with respect to the target vehicle based on the TTC of the vehicle with respect to the target vehicle.

The processor 140 may then be configured to compare the calculated expected amount of deceleration with the deceleration criterion (S140). The processor 140 may be configured to determine whether the expected amount of deceleration is equal to or less than the deceleration criterion. The processor 140 may be configured to determine to perform the lane change assist control in response to determining that the expected amount of deceleration is equal to or less the deceleration criterion (150). The processor 140 may be configured to request the lane change assist controller 200 to execute the lane change assist, so that the lane change assist controller 200 performs the lane change assist. In response to determining that the expected amount of deceleration is greater than the deceleration criterion, the processor 140 may be configured to determine not to perform the lane change assist control (S160). The processor 140 may then be configured to limit the operation of the lane change assist controller 200, so that the lane change assist control is not performed.

Figure 6:
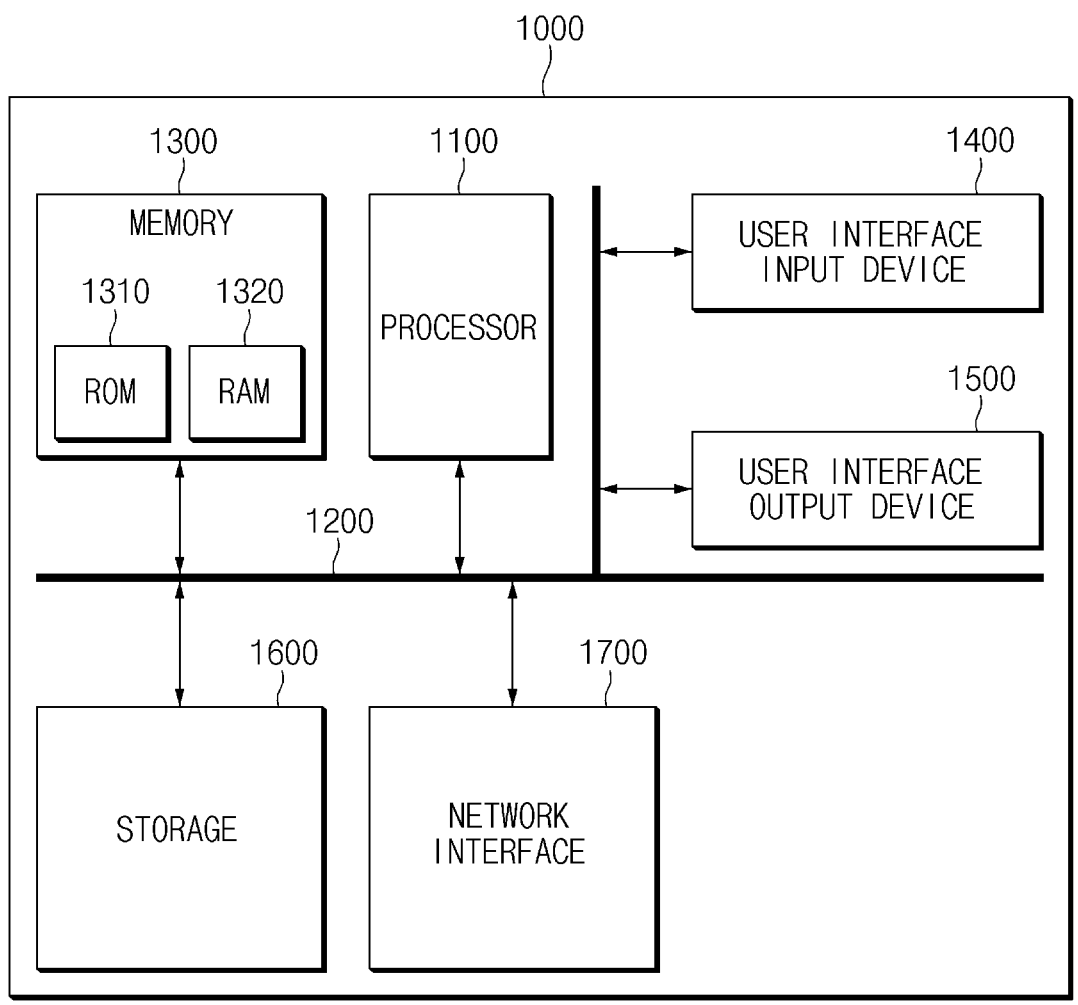
FIG. 6 illustrates a computing system in which an operation method according to an exemplary embodiment of the present disclosure is implemented.

FIG. 6 illustrates a computing system in which an operation method according to an exemplary embodiment of the present disclosure is implemented. With reference to FIG. 6, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device configured to perform processing of commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the exemplary embodiments disclosed herein may be embodied directly in a hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure. Therefore, the exemplary embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the present disclosure, the operating time point of the lane change assist function may be adjusted based on the expected amount of deceleration of the vehicle when changing the lane along a road on which the vehicle is being driven. Thus, a sudden deceleration is prevented when changing the lane thus preventing the driver from feeling discomfort caused by the sudden deceleration.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A driver assist device, comprising:
   a processor; and a non-transitory storage medium containing program instructions executed by the processor, wherein the processor is configured to:
  determine a possibility of collision between a subject vehicle and another vehicle in a target lane, in response to the subject vehicle activating a lane change assist function;
  calculate an expected amount of deceleration of the subject vehicle with respect to a target vehicle in the target lane in response to determining there is no possibility of collision between the subject vehicle and the other vehicle; and
  compare the calculated expected amount of deceleration of the subject vehicle with a deceleration criterion, and determine whether to perform lane change assist control based on a comparison result;
  wherein calculating the expected amount of deceleration includes:
    calculating a required acceleration with respect to a distance error between an actual distance between the subject vehicle and the target vehicle and a preset target vehicle-to-vehicle distance;
    calculating a required acceleration with respect to a speed error between the subject vehicle and the target vehicle;
    calculating a required acceleration of the subject vehicle from the required acceleration with respect to the distance error and the required acceleration with respect to the speed error; and
    calculating the expected amount of deceleration based on the required acceleration of the subject vehicle.

2. The driver assist device of claim 1, wherein the processor is configured to activate the lane change assist function based on a user input.

3. The driver assist device of claim 2, wherein the user input is a signal generated based on manipulation of a switch for activating the lane change assist function.

4. The driver assist device of claim 1, wherein the processor is configured to:
  calculate a first required acceleration of the subject vehicle with respect to a first target vehicle in the target lane;
  calculate a second required acceleration of the subject vehicle with respect to a second target vehicle in a traveling lane; and
  calculate the expected amount of deceleration based on a smaller required acceleration among the first required acceleration and the second required acceleration.

5. The driver assist device of claim 4, wherein the processor is configured to limit the first required acceleration based on a time to collision of the subject vehicle with respect to the first target vehicle.

6. The driver assist device of claim 1, wherein the processor is configured to calculate the deceleration criterion based on a speed of the subject vehicle.

7. The driver assist device of claim 6, wherein the deceleration criterion is set to be decreased as the speed of the subject vehicle increases.

8. The driver assist device of claim 1, wherein the processor is configured to determine to perform the lane change assist control in response to determining that the expected amount of deceleration is equal to or less than the deceleration criterion.

9. The driver assist device of claim 1, wherein the processor is configured to determine not to perform the lane change assist control in response to determining that the expected amount of deceleration is greater than the deceleration criterion.

10. A method for operating a driver assist device, comprising:
  determining, by a processor, a possibility of collision between a subject vehicle and another vehicle in a target lane when the subject vehicle activates a lane change assist function;
  calculating, by the processor, an expected amount of deceleration of the subject vehicle with respect to a target vehicle in the target lane in response to determining there is no possibility of collision between the subject vehicle and the other vehicle; and
  comparing, by the processor, the calculated expected amount of deceleration of the subject vehicle with a deceleration criterion to determine whether to perform lane change assist control;
  wherein calculating the expected amount of deceleration includes:
    calculating a required acceleration with respect to a distance error between an actual distance between the subject vehicle and the target vehicle and a preset target vehicle-to-vehicle distance;
    calculating a required acceleration with respect to a speed error between the subject vehicle and the target vehicle;
    calculating a required acceleration of the subject vehicle from the required acceleration with respect to the distance error and the required acceleration with respect to the speed error; and
    calculating the expected amount of deceleration based on the required acceleration of the subject vehicle.

11. The method of claim 10, wherein the determining of the possibility of collision further includes:
  activating, by the processor, the lane change assist function based on a user input.

12. The method of claim 11, wherein the user input is a signal generated based on manipulation of a switch for activating the lane change assist function.

13. The method of claim 10, wherein the calculating of the expected amount of deceleration includes:
  calculating, by the processor, a first required acceleration of the subject vehicle with respect to a first target vehicle in the target lane;
  calculating, by the processor, a second required acceleration of the subject vehicle with respect to a second target vehicle in a traveling lane; and
  calculating, by the processor, the expected amount of deceleration based on a smaller required acceleration among the first required acceleration and the second required acceleration.

14. The method of claim 13, wherein the calculating of the first required acceleration further includes:
  limiting, by the processor, the first required acceleration based on a time to collision of the subject vehicle with respect to the first target vehicle.

15. The method of claim 10, wherein the calculating of the expected amount of deceleration further includes:
  calculating, by the processor, the deceleration criterion based on a speed of the subject vehicle.

16. The method of claim 15, wherein the deceleration criterion is set to be decreased as the speed of the subject vehicle increases.

17. The method of claim 10, wherein the determining of whether to perform the lane change assist control includes:

determining, by the processor, to perform the lane change assist control in response to determining that the expected amount of deceleration is equal to or less than the deceleration criterion.

18. The method of claim 17, wherein the determining of whether to perform the lane change assist control further includes:

determining, by the processor, not to perform the lane change assist control in response to determining that the expected amount of deceleration is greater than the deceleration criterion.

19. The driver assist device of claim 1, wherein a possibility of collision between a subject vehicle and another vehicle in a target lane is determined in response to the subject vehicle activating the lane change assist function.

* * * * *